(12) United States Patent
Zhuang et al.

(10) Patent No.: US 11,550,064 B1
(45) Date of Patent: Jan. 10, 2023

(54) APPARATUS, SYSTEM AND METHOD FOR PROVIDING GLOBAL LOCALIZATION OUTPUT AND APPLICATION OF SAME

(71) Applicant: Guangzhou Xiaopeng Autopilot Technology Co., Ltd., Guangdong (CN)

(72) Inventors: Hairuo Zhuang, San Diego, CA (US); Amit Bansal, San Diego, CA (US); Venkatesan Nallampatti Ekambaram, San Diego, CA (US); Vignesh Sethuraman, San Diego, CA (US)

(73) Assignee: GUANGZHOU XIAOPENG AUTOPILOT TECHNOLOGY CO., LTD., Guangdong (CN)

( * ) Notice: Subject to any disclaimer, the term of this patent is extended or adjusted under 35 U.S.C. 154(b) by 71 days.

(21) Appl. No.: 17/363,445

(22) Filed: Jun. 30, 2021

(51) Int. Cl.
| | |
|---|---|
| *G01S 19/39* | (2010.01) |
| *G01S 19/55* | (2010.01) |
| *G01S 19/25* | (2010.01) |
| *G01S 19/12* | (2010.01) |

(52) U.S. Cl.
CPC ............ *G01S 19/393* (2019.08); *G01S 19/12* (2013.01); *G01S 19/254* (2013.01); *G01S 19/55* (2013.01)

(58) Field of Classification Search
CPC ...... G01S 19/393; G01S 19/12; G01S 19/254; G01S 19/55; G01S 19/22; G01S 19/21
See application file for complete search history.

(56) References Cited

U.S. PATENT DOCUMENTS

| | | | |
|---|---|---|---|
| 11,276,201 B1* | 3/2022 | Garcia Sopo | ............. G06T 7/73 |
| 2014/0214317 A1* | 7/2014 | Sanjay | ................. G01C 21/165 |
| | | | 701/469 |
| 2021/0207961 A1* | 7/2021 | Saini | .................... G01C 21/165 |

* cited by examiner

*Primary Examiner* — Erin F Heard
*Assistant Examiner* — Kenneth W Good
(74) *Attorney, Agent, or Firm* — Locke Lord LLP; Tim Tingkang Xia, Esq.

(57) ABSTRACT

An apparatus and a method for providing a global localization output are provided. When the apparatus receives navigation signals, the apparatus processes the signals to determine, based on a fixed earth-centered, earth-fixed (ECEF) reference pose of a reference point in an ECEF coordinate, a new ECEF pose, and to convert the fixed ECEF reference pose to an east-north-up (ENU) reference pose in an ENU coordinate. When the apparatus determines that a jump occurs in the new ECEF pose based on a pose change between the new ECEF pose and a previous ECEF pose, the apparatus calculates a reference shift of the ENU reference pose based on the pose change to absorb the jump in the ENU coordinate, and updates the ENU reference pose based on the reference shift. Thus, a new ENU local pose may be obtained using the ENU reference pose.

20 Claims, 6 Drawing Sheets

APPARATUS, SYSTEM AND METHOD FOR PROVIDING GLOBAL LOCALIZATION OUTPUT AND APPLICATION OF SAME

FIELD OF THE INVENTION

The present invention relates generally to satellite navigation technology, and more particularly to a system and method for providing global localization output accurately and smoothly using a single Extended Kalman Filter (EKF) engine, and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

The Global Navigation Satellite System (GNSS) is an essential part for obtaining accurate global positioning, and is widely used for vehicle localization purposes. Localization helps to map the position of the vehicle on the map, and model vehicle characteristics like speed, acceleration, angle of turn, etc. Due to environmental factors like Ionospherical Interference or Multipath reflections from obstacles such as tall buildings, there is sometimes noise in the satellite Observations, and the vehicle position from localization may "jump" thinking the vehicle is biased. However, the vehicle in real life clearly cannot move or "jump" beyond a certain limit, and these "jumps" are corrections of localization drifts or a result of an undesirable observation. These jumps may cause motion control to have abnormal acceleration and de-acceleration.

Therefore, a heretofore unaddressed need exists in the art to address the aforementioned deficiencies and inadequacies.

SUMMARY OF THE INVENTION

The present invention relates to an apparatus, system and method for providing global localization output accurately and smoothly using a single Extended Kalman Filter (EKF) engine, and application of the same. Specifically, the apparatus, system and method utilizes conversion between the earth-centered, earth-fixed (ECEF) and east-north-up (ENU) coordinates, in which the fixed ECEF reference pose (i.e., combination of position and orientation) of the reference point is converted to a variable ENU reference pose. When the EKF engine performs a GNSS measurement and observes a jump, the variable ENU reference pose is modified to absorb the jump. Thus, the local pose in the ENU coordinate looks smooth due to the modified ENU reference pose, while the global pose in the ECEF coordinate still reflects the accurate global pose.

In one aspect of the invention, an apparatus for providing a global localization output is provided. In certain embodiments, the apparatus includes a receiving device communicatively connected to a navigation system to receive navigation signals; and a computing device having a processor and a storage device storing computer executable instructions. The computer executable instructions, when executed on the processor, cause the processor to: process the navigation signals received to determine, based on a fixed earth-centered, earth-fixed (ECEF) reference pose of a reference point in an ECEF coordinate, a new ECEF pose of the apparatus; convert the fixed ECEF reference pose of the reference point in the ECEF coordinate to an east-north-up (ENU) reference pose in an ENU coordinate, wherein the ENU reference pose is variable; determine whether a jump occurs in the new ECEF pose of the apparatus in the ECEF coordinate based on a pose change between the new ECEF pose and a previous ECEF pose of the apparatus; in response to determining that the jump occurs, calculate a reference shift of the ENU reference pose based on the pose change to absorb the jump in the ENU coordinate, and update the ENU reference pose based on the reference shift; obtain a new ENU local pose of the apparatus using the ENU reference pose; and output the new ENU local pose as a current pose of the apparatus.

In another aspect of the present invention, a method for providing a global localization output includes: receiving navigation signals by an apparatus communicatively connected to a navigation system; processing, by the apparatus, the navigation signals received to determine, based on a fixed earth-centered, earth-fixed (ECEF) reference pose of a reference point in an ECEF coordinate, a new ECEF pose of the apparatus; converting, by the apparatus, the fixed ECEF reference pose of the reference point in the ECEF coordinate to an east-north-up (ENU) reference pose in an ENU coordinate; determining, by the apparatus, whether a jump occurs in the new ECEF pose of the apparatus in the ECEF coordinate based on a pose change between the new ECEF pose and a previous ECEF pose of the apparatus; in response to determining that the jump occurs, calculating, by the apparatus, a reference shift of the ENU reference pose based on the pose change to absorb the jump in the ENU coordinate, and updating the ENU reference pose based on the reference shift; obtaining, by the apparatus, a new ENU local pose of the apparatus using the ENU reference pose; and outputting, by the apparatus, the new ENU local pose as a current pose of the apparatus.

Yet another aspect of the present invention relates to non-transitory tangible computer-readable medium storing computer executable instructions which, when executed by one or more processors, cause the method as discussed to be performed.

In one embodiment, the ENU reference pose is updated based on based on the pose change by: calculating a reference shift of the ENU reference pose based on the pose change to absorb the jump in the ENU coordinate; and updating the ENU reference pose based on the reference shift In one embodiment, the jump is determined to occur in response to determining that the pose change exceeds a threshold.

In one embodiment, the pose change includes: a position shift between the new ECEF pose and the previous ECEF pose on a X-Y plane in the ECEF coordinate; and a yaw shift between the new ECEF pose and the previous ECEF pose along a yaw direction in the ECEF coordinate.

In one embodiments, the threshold is a position shift threshold, and the jump is determined to occur in response to determining that the position shift in the ECEF coordinate exceeds the position shift threshold.

In one embodiment, the threshold is a yaw shift threshold, and the jump is determined to occur in response to determining that the yaw shift in the ECEF coordinate exceeds the yaw shift threshold.

In one embodiment, the method further includes: receiving, by the apparatus, an adjusting input to adjust the threshold; and adjusting the threshold based on the adjusting input.

In one embodiment, the navigation system is a Global Navigation Satellite System (GNSS), and the navigation signals are GNSS signals.

Yet a further aspect of the invention relates to a vehicle or an autonomous system having the apparatus as described above.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1:
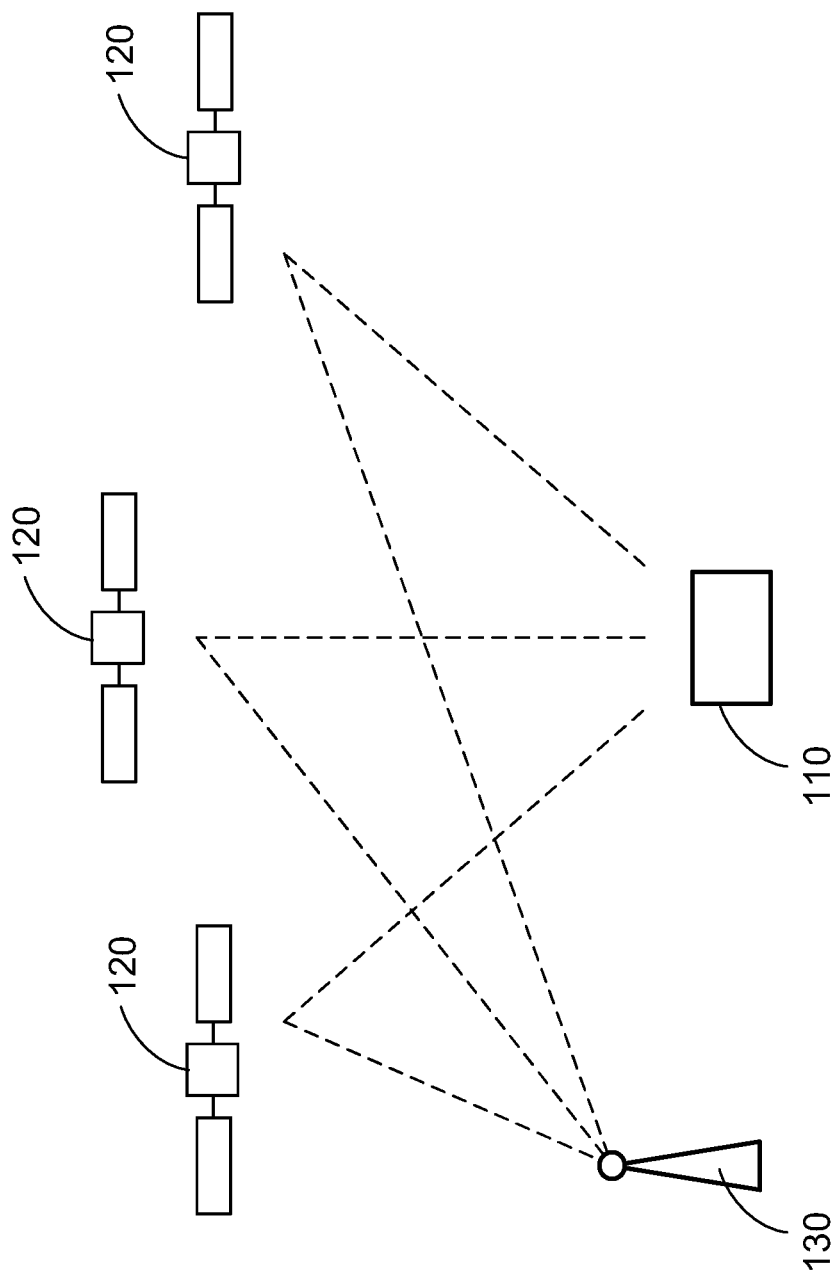
FIG. 1 shows schematically an overall architecture of a Global Navigation Satellite System (GNSS) according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The term "pose," as used herein, refers to a combination of position and orientation of an object.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

For a vehicle positioning apparatus, downstream modules to localization have several and sometimes conflicting requirements. One of the requirements would be a smooth 6-degree of freedom (DOF) output, and another requirement would be globally accurate positioning. As discussed above, a vehicle position from localization may "jump" due to environmental noise. When the jumps occur frequently, the output for navigation or positioning in the localization process may not be smooth. On the other hand, any algorithm to reduce the jumps in order to provide a smooth localization output may cause the global positioning to be inaccurate. Satisfying both smoothness and accuracy constraints with a single positioning engine is very difficult and may even be theoretically impossible. For example, a single positioning engine may either focus on the accuracy, which may provide globally accurate positioning, but without the smoothness due to the jumps, or may aim on providing smooth localization with no jumps, but the positioning may not be globally accurate.

However, for shorter distance positioning, the smoothness requirement may be more relaxed, as the change in pose over a relatively short distance needs to be smooth and only locally (instead of globally) accurate. Specifically, a local coordinate system is commonly used in most target and tracking applications. For example, in aviation applications, positions are tracked in an east-north-up (ENU) system, where the ENU coordinate is used. Some military target tracking applications also use the local tangent system as well. In addition, autonomous systems (such as autonomous driving, package-delivery drones, etc.) that rely on global positioning accuracy may also track the position of the mobile entity in the ENU frame. All these require a local frame. Autonomous systems that have on-board control also typically have a stringent requirement on the smoothness of the pose (i.e., the position and orientation). This can be satisfied using a positioning engine that may not be globally accurate, but has good relative change in pose accuracy.

Accordingly, in certain aspects of the present invention, in a local frame (such as the ENU frame), the reference frame to define the local frame does not need to be fixed. For example, in an EKF engine used in a GNSS receiver, any jumps in the pose occur during the consumption of GNSS measurements. Whenever the GNSS measurement is consumed in the engine, and a jump in the state is observed, the reference anchor in the local frame may be modified to absorb this jump. Therefore, when the local pose in the local frame is output from the module, it always looks smooth, as the reference pose is the one that is modified and shaking, which does not affect the downstream modules of the receiver.

To address the aforementioned issues, certain aspects of the present invention relate to an apparatus, system and method for providing global localization output accurately and smoothly using a single EKF engine, and application of the same. Specifically, the apparatus, system and method utilizes conversion between the global ECEF and local ENU coordinates, in which the fixed ECEF reference pose (i.e., combination of position and orientation) of a reference point is converted to a variable ENU reference pose. When the EKF engine in the apparatus performs a GNSS measurement and observes a jump, the variable ENU reference pose is modified to absorb the jump, and the positioning is performed using the local pose in the ENU coordinate based on the modified ENU reference pose. Thus, the local pose looks smooth due to the modified ENU reference pose, while the global pose in the ECEF coordinate still reflects the accurate global pose.

One aspect of the invention relates to an apparatus for providing a global localization output, in which only one single engine is used. FIG. 1 shows schematically an overall architecture of a GNSS according to one embodiment of the invention. It should be noted that the GNSS 100 is provided as a navigation system, and in certain embodiments, other navigation system may be used.

As shown in FIG. 1, the GNSS 100 includes a GNSS receiver 110, a plurality of satellites 120, and a reference point 130. Specifically, the GNSS receiver 110 may be an apparatus having a receiving device communicatively connected to the satellites 120, such that the GNSS receiver 110 may receive GNSS signals from the satellites 120. In certain embodiments, the GNSS receiver 110 may be in the form of an in-vehicle device installed or mounted in a vehicle, which may be a car, a motocycle, a plane, a ship, a rover or other types of vehicles that require positioning or localization functions. In one embodiment, the in-vehicle device may provide autonomous functions, thus making the vehicle an autonomous system. Further, the GNSS receiver 110 also includes a computing device to process the GNSS signals received from the satellites 120 and to perform GNSS outlier detection and rejection. In certain embodiment, the computing device may be an in-vehicle computer, such as the built-in electronic control unit (ECU) of the vehicle. Alternatively, in certain embodiments, the computing device may be an individual computing device or control unit of the GNSS receiver 110, which runs independently and separately from the existing ECU of the vehicle. In certain embodiments, the computing device may be a general purpose computer being provided with the necessary hardware and/or software components to perform object detection, or may be a specialized computer or controller specifically designed and configured to perform object detection.

Further, the reference point 130 may be a fixed station provided with a corresponding receiver, which also receive GNSS signals from the satellites 120. Since the reference point 130 is fixed, its reference pose (i.e., combination of position and orientation) may be used to provide accurate positioning for the GNSS receiver 110.

Figure 2A:
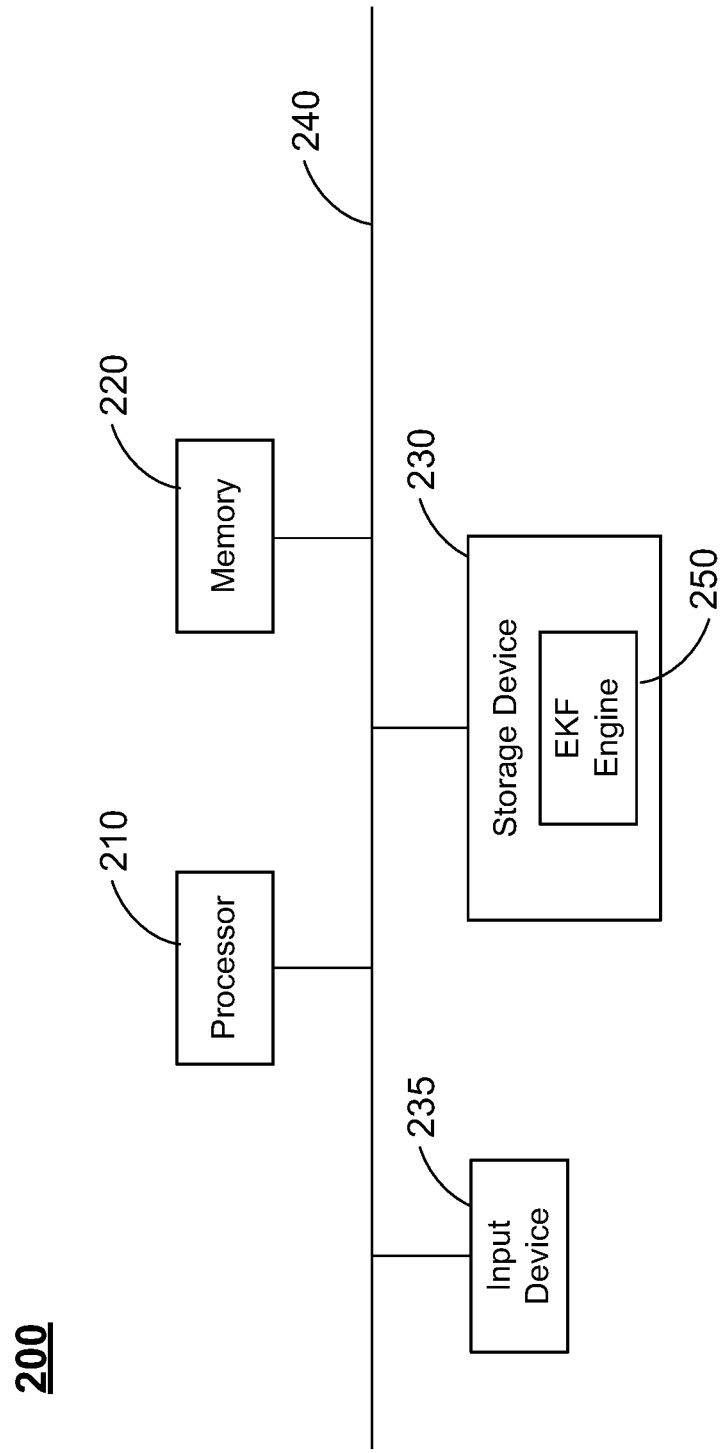
FIG. 2A shows schematically a computing device of the GNSS receiver according to one embodiment of the invention.

FIG. 2A shows schematically a computing device of the GNSS receiver according to one embodiment of the invention. Specifically, the computing device 200 as shown in FIG. 2A is used as the computing device of the GNSS receiver 110 (i.e., the apparatus) as shown in FIG. 1. As shown in FIG. 2A, the computing device 200 includes a processor 210, a memory 220, and a storage device 230, and a bus 240 interconnecting the processor 210, the memory 220 and the storage device 230. Optionally, an input device 235 may also be provided in the computing device 200. In certain embodiments, the computing device 200 may include necessary hardware and/or software components (not shown) to perform its corresponding tasks. Examples of these hardware and/or software components may include, but not limited to, other required memory modules, interfaces, buses, Input/Output (I/O) modules and peripheral devices, and details thereof are not elaborated herein.

The processor 210 controls operation of the computing device 200, which may be used to execute any computer executable code or instructions. In certain embodiments, the processor 210 may be a central processing unit (CPU), and the computer executable code or instructions being executed by the processor 210 may include an operating system (OS) and other applications, codes or instructions stored in the computing device 200. In certain embodiments, the computing device 200 may run on multiple processors, which may include any suitable number of processors.

The memory 220 may be a volatile memory module, such as the random-access memory (RAM), for storing the data and information during the operation of the computing device 200. In certain embodiments, the memory 220 may be in the form of a volatile memory array. In certain embodiments, the computing device 200 may run on more than one memory 220.

The storage device 230 is a non-volatile storage media or device for storing the computer executable code or instructions, such as the OS and the software applications for the computing device 200. Examples of the storage device 230 may include flash memory, memory cards, USB drives, or other types of non-volatile storage devices such as hard drives, floppy disks, optical drives, or any other types of data storage devices. In certain embodiments, the computing device 200 may have more than one storage device 230, and the software applications of the computing device 200 may be stored in the more than one storage device 230 separately.

The input device 235 is a peripheral device allowing a user of the GNSS receiver 100 to create an input into the computing device 200. For example, as will be described later, the user may input a threshold (or multiple thresholds) to be used in the jump determination process with the input device 235, and the computing device, upon receiving the input through the input device 235, may update the threshold based on the input. Examples of the input device 235 may include, without being limited thereto, a keyboard, a touchpad, switches, buttons or other types of input devices.

Figure 2B:
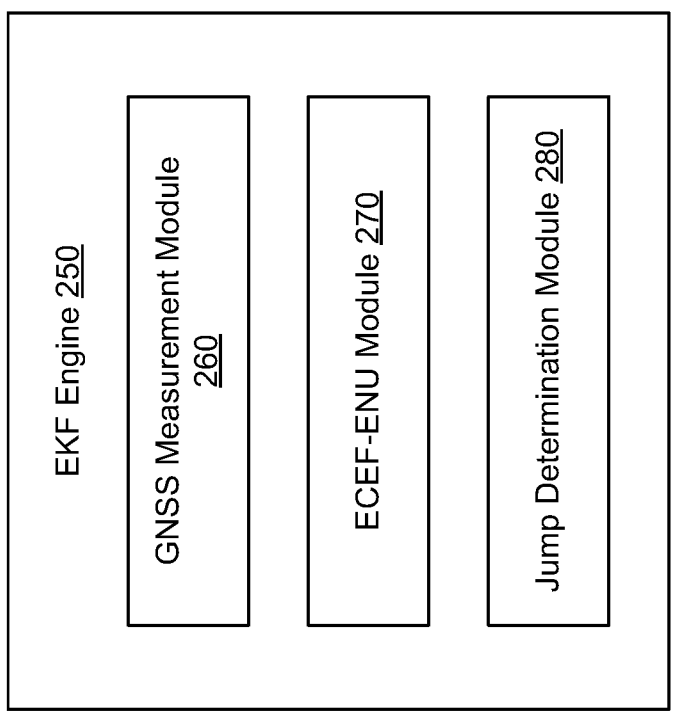
FIG. 2B shows schematically an Extended Kalman Filter (EKF) engine in the computing device as shown in FIG. 2A according to one embodiment of the invention.

As shown in FIG. 2A, the computer executable code stored in the storage device 230 may include an EKF engine 250. Specifically, the EKF engine 250 is in the form of a software module which, when executed, provides the global positioning functions for processing the GNSS signals and generating the local pose of the apparatus. FIG. 2B shows schematically an EKF engine in the computing device as shown in FIG. 2A according to one embodiment of the invention. Specifically, the EKF engine 250 as shown in FIG. 2B includes a GNSS measurement module 260, an ECEF-ENU module 270, and a jump determination module 280.

The GNSS measurement module 260 is used to perform GNSS measurements for the apparatus (i.e., the GNSS receiver 110 as shown in FIG. 1). Specifically, when the GNSS receiver 110 receives the GNSS signals, the GNSS measurement module 260 processes the GNSS signals received to determine the pose of the apparatus in the ECEF frame. For description purposes, the pose of the apparatus in the ECEF frame is hereinafter referred to as the "ECEF pose," which is in contrast to the "ENU local pose" (i.e., the local pose of the apparatus in the ENU frame) to be described later. Further, since the apparatus (i.e., the GNSS receiver 110) may be installed or mounted on a vehicle which is moving, the GNSS measurement module 260 may generate multiple poses in different frames, and for description purposes, the pose being generated based on the newly received GNSS signals is referred to as the "new" pose, and the pose previously generated in a previous frame is referred to as the "previous" pose. In certain embodiments, the GNSS signals received may include the ECEF reference pose of the reference point 130 in an ECEF coordinate, and the GNSS measurement module 260 may generate a new ECEF pose of the apparatus based on the ECEF reference pose.

Figure 3:
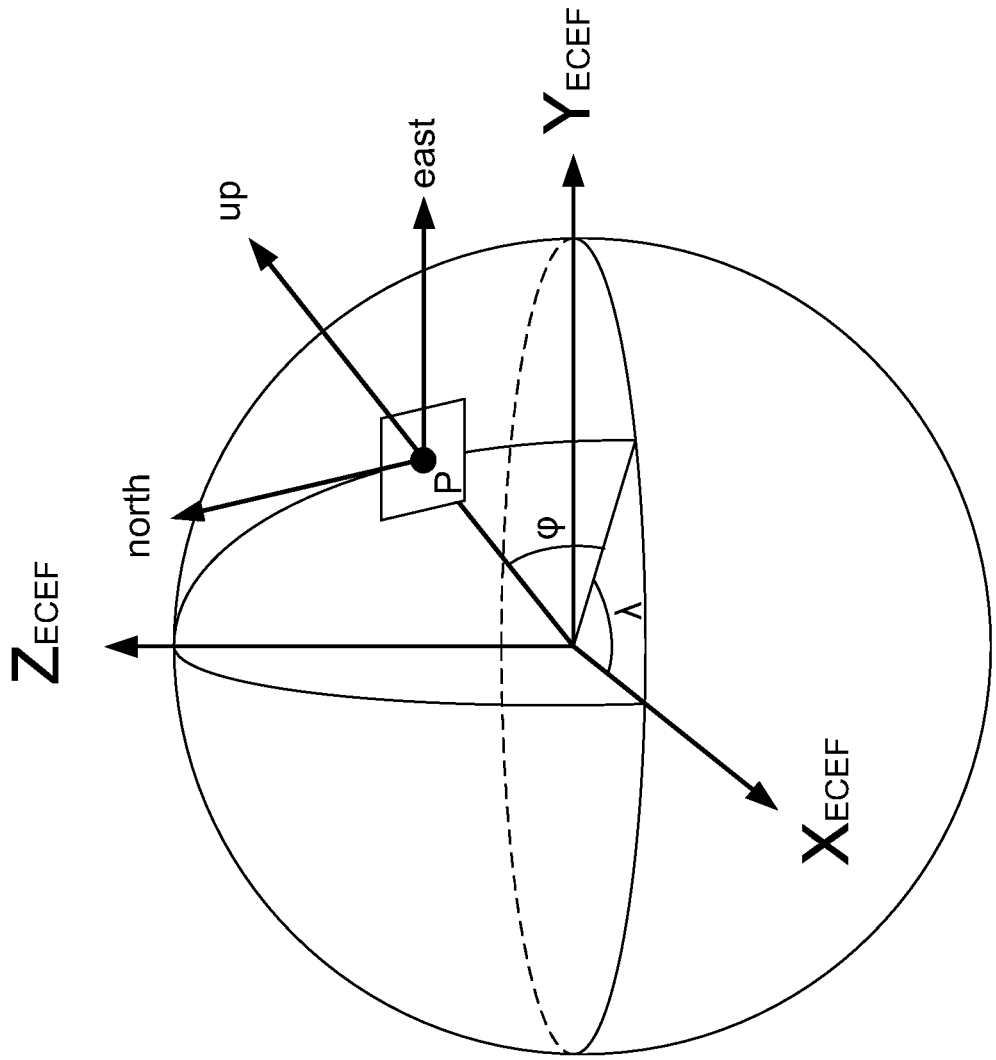
FIG. 3 shows schematically an earth-centered, earth-fixed (ECEF) coordinate and an east-north-up (ENU) coordinate according to one embodiment of the invention.

The ECEF-ENU module 270 is used to perform conversion of the ECEF poses generated by the GNSS measurement module 260. Specifically, the poses generated by the GNSS measurement module 260 are all in the global ECEF frames, and to increase the smoothness of the output, the ECEF poses must be converted to ENU poses in a local ENU frame. FIG. 3 shows schematically an ECEF coordinate and an ENU coordinate according to one embodiment of the invention. As shown in FIG. 3, for a specific point P on earth, the ECEF coordinate may provide a corresponding global ECEF pose, which includes the ECEF position (X, Y, Z) and the ECEF orientation ($\lambda$, $\varphi$). In contrast, the ENU coordinate may indicate the position of the point P in a local 3D ENU frame. Thus, the ECEF-ENU module 270 may convert the fixed ECEF reference pose of the reference point 110 in the ECEF coordinate to an ENU reference pose in an ENU coordinate. The ECEF reference pose may remain fixed, and the ENU reference pose may be variable and modifiable.

The jump determination module 280 is used to perform a jump determination process to determine whether a jump occurs based on a pose change between the new ECEF pose and a previous ECEF pose of the apparatus. Specifically, as discussed above, a vehicle in real life clearly cannot move or "jump" beyond a certain limit. Thus, if the pose change between the new ECEF pose and the previous ECEF pose exceeds a threshold, the jump determination module 280 may determine that a jump occurs.

As discussed above, in the ECEF coordinate, an ECEF pose includes the ECEF position (X, Y, Z) and the ECEF orientation ($\lambda$, $\varphi$) as shown in FIG. 3. In certain embodiments, the pose change between the new ECEF pose and the previous ECEF pose may be defined to include a position shift between the new ECEF pose and the previous ECEF pose on the X-Y plane in the ECEF coordinate; and a yaw shift between the new ECEF pose and the previous ECEF pose along the yaw direction ($\lambda$) in the ECEF coordinate. In other words, the position shift refers to a position or distance change of the ECEF pose on the X-Y plane, which may be calculating by square rooting the sum of squares of the change in the X pose and Y pose between a current time stamp and a previous time stamp, and the yaw shift refers to a yaw angle ($\lambda$) change between the current time stamp and the previous time stamp. Correspondingly, the threshold may include a position shift threshold and a yaw shift threshold. Thus, the jump determination module 280 may determine that a jump occurs when it is determined that the position shift in the ECEF coordinate exceeds the position shift threshold, and/or that the yaw shift in the ECEF coordinate exceeds the yaw shift threshold.

Figure 4:
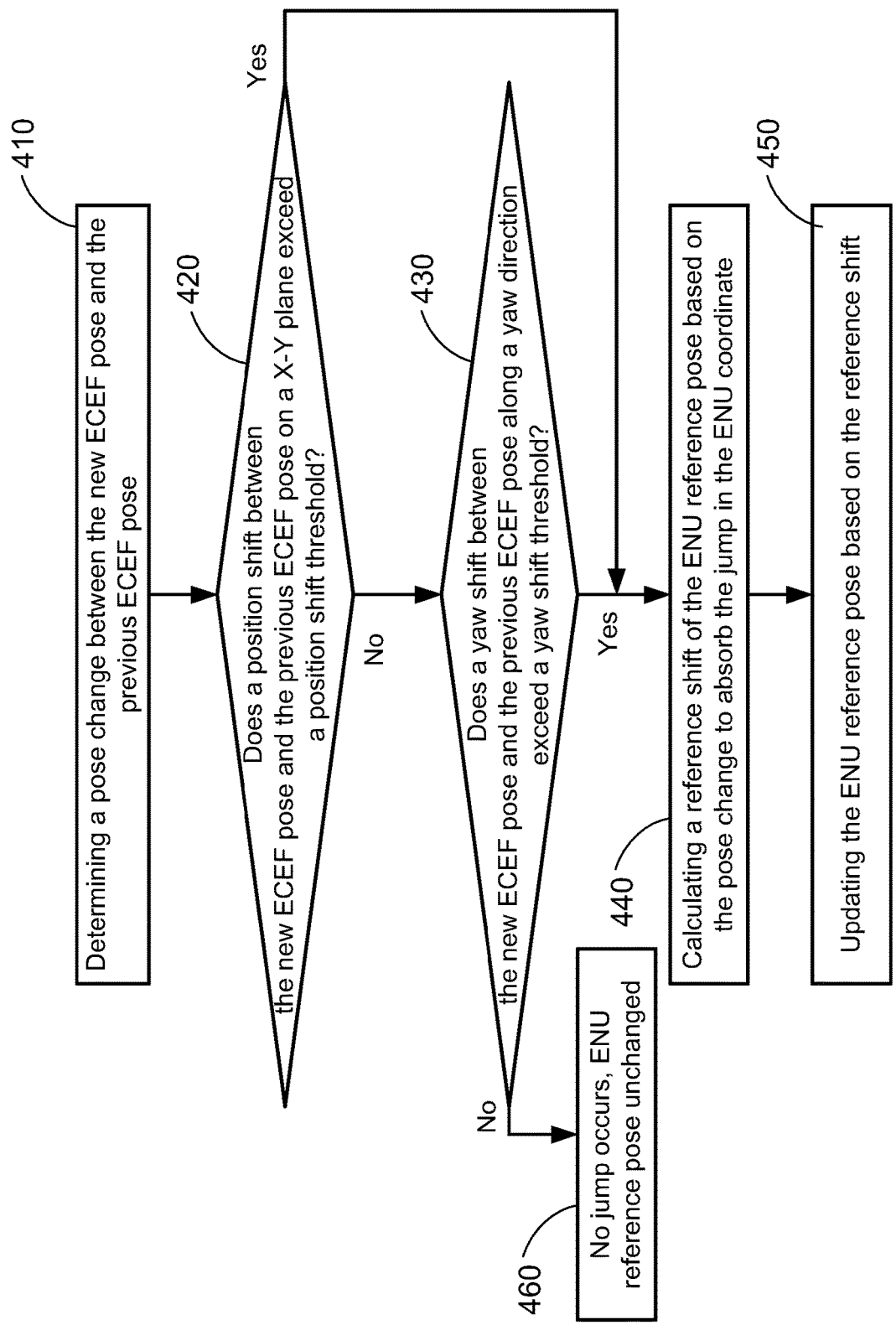
FIG. 4 shows a flowchart of a jump determination process according to one embodiment of the invention.

FIG. 4 shows a flowchart of a jump determination process according to one embodiment of the invention. Specifically, the jump determination process as shown in FIG. 4 may be performed by the jump determination module 280 as shown in FIG. 2B. It should be noted that, unless otherwise stated in the present disclosure, the steps of the flowchart as shown in FIG. 4 may be arranged in a different sequential order, and are thus not limited to the sequential order as shown in FIG. 4.

As shown in FIG. 4, at the process 410, the jump determination module 280 determines the pose change between the new ECEF pose and the previous ECEF pose. In certain embodiments, the pose change may include a position shift between the new ECEF pose and the previous ECEF pose on the X-Y plane and a yaw shift between the new ECEF pose and the previous ECEF pose along the yaw direction. Once the pose change is determined, at the processes 420 and 430, the jump determination module 280 determines whether the pose change exceeds the threshold. Specifically, at the process 420, the jump determination module 280 determines whether the position shift exceeds the position shift threshold, and at the process 430, the jump determination module 280 determines whether the yaw shift exceeds the yaw shift threshold. It should be noted that the processes 420 and 430 do not need to be performed in a specifically sequence. If the jump determination module 280 determines that the pose change exceeds the threshold (i.e., either the position shift exceeds the position shift threshold or the yaw shift exceeds the yaw shift threshold), the jump determination module 280 determines that the jump occurs. In this case, at the process 440, the jump determination module 280 calculates a reference shift of the ENU reference pose based on the pose change to absorb the jump in the ENU coordinate. Then, at the process 450, the jump determination module 280 updates the ENU reference pose based on the reference shift obtained in the process 440. On the other hand, if the jump determination module 280 determines that the pose change does not exceed the threshold (i.e., the position shift does not exceed the position shift threshold, and the yaw shift does not exceed the yaw shift threshold), at the process 460, the jump determination module 280 determines that no jump occurs, and the ENU reference pose remains unchanged.

In certain embodiments, the jump determination process as discussed above may be useful particularly in the global positioning system (GPS) in a vehicle, such as a car or a motorcycle, or in autonomous systems. Specifically, in an autonomous system, a jump in the localization is undesirable in Level 2 driving as it makes it difficult for lane-tracking to associate and track lanes. Such jumps may occur due to noise and environment reflections from the GPS.

As discussed, the ECEF reference pose (Ref_pose_ecef) helps to transform the vehicle position from the ECEF frame to the ENU frame. Since the pose change involves the position shift on the X-Y plane and the yaw shift along the yaw direction, the ECEF reference pose (Ref_pose_ecef) may be converted to the ENU reference pose to compensate for the pose change (i.e., the position shift and/or the yaw shift). In certain embodiments, the local pose output in the ENU frame may be defined as:

$$\text{local\_pose} = \text{refpose\_ecef.inverse}(\ )*\text{vehiclepose\_ecef} \quad (1)$$

where the function refpose_ecefinverse( ) gets updated on detection of a yaw and/or position shift in the jump determination process. The refpose is the reference anchor to convert to ENU, and the vehiclepose_ecef is the current vehicle position in ECEF.

Thus, the reference shift (Rdiff) can be in the form of a transform between the updated and current ref_pose, which is defined as:

$$\text{Rdiff} = \text{current\_local\_pose}.R(\ )*\text{updated\_global\_pose\_}R(\ ).\text{transpose}(\ )*R\_\text{ecef\_}enu \quad (2)$$

Using the reference shift (Rdiff), the updated ENU reference pose (new_R) and the new ENU local pose (new_P) may be obtained for refpose_ecef as follows:

$$\text{new\_}R = R\_\text{ecef\_}enu*\text{Rdiff} \quad (3)$$

$$\text{new\_}p = \text{new\_global\_pose}.p(\ ) - \text{new\_}R*\text{curr\_local\_pose}.p(\ ) \quad (4)$$

Thus, it would be possible to make the local pose output smooth in the ENU frame using the updated ENU reference pose (new_R) and the new ENU local pose (new_P), as the reference shift (Rdiff) absorbs the jump. However, when observing the local pose output in the ECEF frame, the new ECEF pose would still have the jumps, and is thus globally accurate.

It should be noted that the formulas and functions provided above constitute an exemplary embodiment to perform the transformation to convert the pose from the car frame to the ENU frame. However, the actual transformation may be performed using different calculation methods, and is not hereinafter limited to the embodiment as described.

Figure 5:
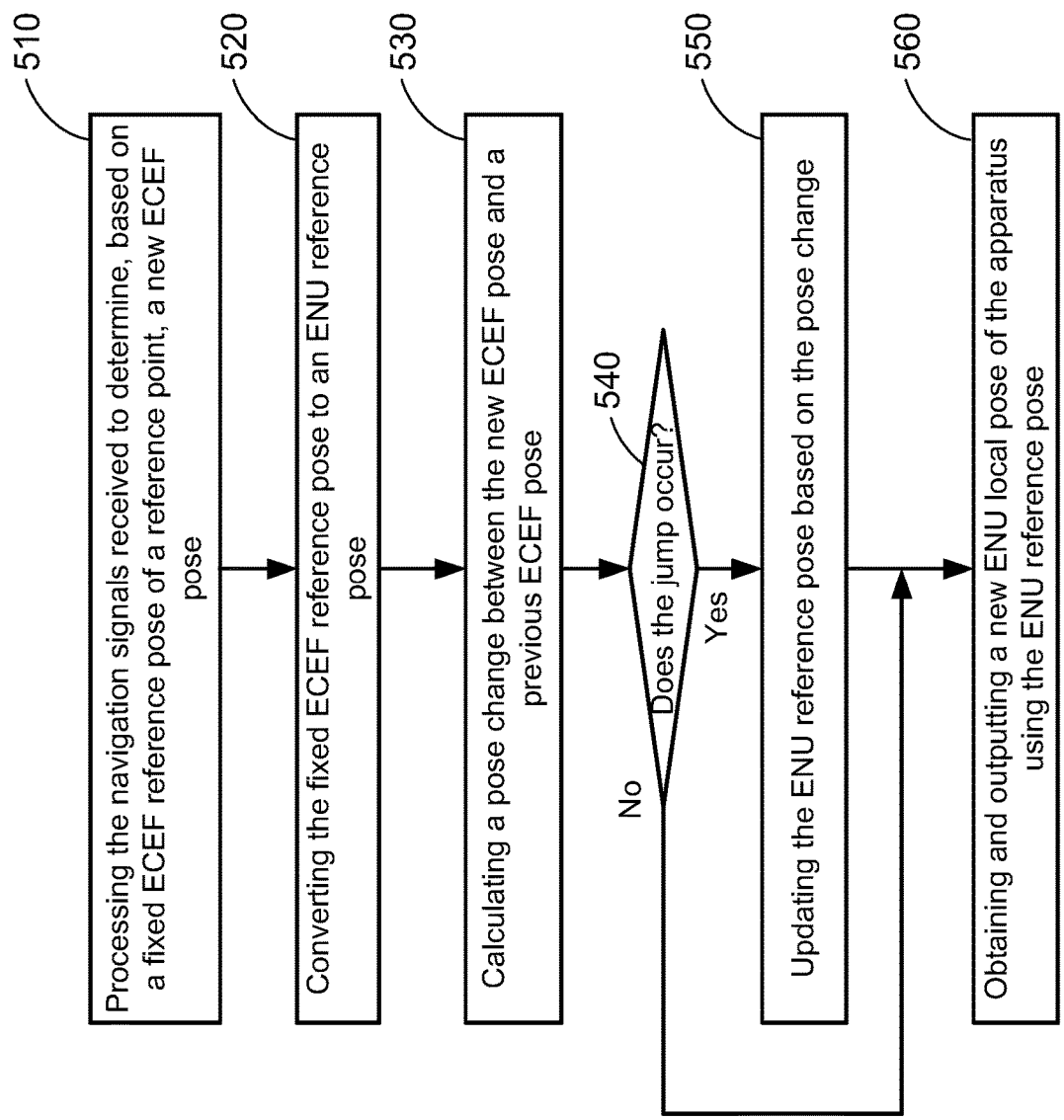
FIG. 5 shows a flowchart of a method for providing a global localization output according to one embodiment of the invention.

In another aspect of the present invention, a method for providing a global localization output is provided. For example, FIG. 5 shows a flowchart of a method for providing a global localization output according to one embodiment of the invention. In certain embodiments, the method as shown in FIG. 5 may be implemented on the GNSS receiver 110 as shown in FIG. 1 and the computing device 200 as shown in FIGS. 2A and 2B. It should be particularly noted that, unless otherwise stated in the present disclosure, the steps of the method may be arranged in a different sequential order, and are thus not limited to the sequential order as shown in FIG. 5.

As shown in FIG. 5, when the apparatus (i.e., the GNSS receiver 110) receives the navigation signals (i.e., the GNSS signals) from the GNSS, at the process 510, the apparatus processes the navigation signals received to determined, based on a fixed ECEF reference pose of a reference point 130, a new ECEF pose. Then, at the process 520, the apparatus converts the fixed ECEF reference pose to an ENU reference pose, which is variable and modifiable. Then, at the processes 530-550, the jump determination process may be performed. Specifically, at the process 530, the jump determination module 280 may calculate a pose change between the new ECEF pose and a pervious ECEF pose. At the process 540, the jump determination module 280 determines whether a jump occurs. If a jump is determined to occur, at the process 550, the jump determination module 280 updates the ENU reference pose based on the pose change. If there is no jump, the jump determination module 280 does not update the ENU reference pose. In certain embodiments, the details of the jump determination process in the processes 530-550 may be referenced in the flowchart as shown in FIG. 4. After the jump determination process, at the process 560, the apparatus may obtain a new ENU local pose of the apparatus using the ENU reference pose, and output the new ENU local pose as a current pose of the apparatus.

Optionally, a user may input, through the input device 235 of the computing device, an adjusting input to adjust the threshold. Once the apparatus receives the adjusting input, the apparatus may adjust the threshold based on the adjusting input.

Yet another aspect of the invention provides a non-transitory tangible computer-readable medium storing instructions which, when executed by one or more processors of an apparatus (i.e., the GNSS receiver), cause the above disclosed method for performing global localization output to be performed. The computer executable instructions or program codes enable the above disclosed apparatus, such as the GNSS receiver or a similar system, to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. An apparatus for providing a global localization output, comprising:
   a receiving device communicatively connected to a navigation system to receive navigation signals; and
   a computing device having a processor and a storage device storing computer executable instructions, wherein the computer executable instructions, when executed on the processor, cause the processor to:
      process the navigation signals received to determine, based on a fixed earth-centered, earth-fixed (ECEF) reference pose of a reference point in an ECEF coordinate, a new ECEF pose of the apparatus;
      convert the fixed ECEF reference pose of the reference point in the ECEF coordinate to an east-north-up (ENU) reference pose in an ENU coordinate, wherein the ENU reference pose is variable;
      determine whether a jump occurs in the new ECEF local position of the apparatus in the ECEF coordinate based on a pose change between the new ECEF pose and a previous ECEF pose of the apparatus;
      in response to determining that the jump occurs, update the ENU reference pose based on the pose change;
      obtain a new ENU local pose of the apparatus using the ENU reference pose; and
      output the new ENU local pose as a current pose of the apparatus.

2. The apparatus of claim 1, wherein the ENU reference pose is updated based on the pose change by: calculating a reference shift of the ENU reference pose based on the pose change to absorb the jump in the ENU coordinate; and updating the ENU reference pose based on the reference shift.

3. The apparatus of claim 1, wherein the jump is determined to occur in response to determining that the pose change exceeds a threshold.

4. The apparatus of claim 3, wherein the pose change comprises:
   a position shift between the new ECEF pose and the previous ECEF pose on a X-Y plane in the ECEF coordinate; and
   a yaw shift between the new ECEF pose and the previous ECEF pose along a yaw direction in the ECEF coordinate.

5. The apparatus of claim 4, wherein:
   the threshold is a position shift threshold, and
   the jump is determined to occur in response to determining that the pose shift in the ECEF coordinate exceeds the position shift threshold.

6. The apparatus of claim 4, wherein:
   the threshold is a yaw shift threshold, and
   the jump is determined to occur in response to determining that the yaw shift in the ECEF coordinate exceeds the yaw shift threshold.

7. The apparatus of claim 3, wherein the computer executable instructions, when executed on the processor, further cause the processor to adjust the threshold based on an adjusting input.

8. A vehicle having the apparatus of claim 1.

9. A method for providing a global localization output, comprising:
   receiving navigation signals by an apparatus communicatively connected to a navigation system;
   processing, by the apparatus, the navigation signals received to determine, based on a fixed earth-centered, earth-fixed (ECEF) reference pose of a reference point in an ECEF coordinate, a new ECEF pose of the apparatus;
   converting, by the apparatus, the fixed ECEF reference pose of the reference point in the ECEF coordinate to an east-north-up (ENU) reference pose in an ENU coordinate, wherein the ENU reference pose is variable;
   determining, by the apparatus, whether a jump occurs in the new ECEF pose of the apparatus in the ECEF coordinate based on a pose change between the new ECEF pose and a previous ECEF pose of the apparatus;
   in response to determining that the jump occurs, updating, by the apparatus, the ENU reference pose based on the pose change;
   obtaining, by the apparatus, a new ENU local pose of the apparatus using the ENU reference pose; and
   outputting, by the apparatus, the new ENU local pose as a current pose of the apparatus.

10. The method of claim 9, wherein the ENU reference pose is updated based on the pose change by: calculating a reference shift of the ENU reference pose based on the pose change to absorb the jump in the ENU coordinate; and updating the ENU reference pose based on the reference shift.

11. The method of claim 9, wherein the jump is determined to occur in response to determining that the pose change exceeds a threshold.

12. The method of claim 11, wherein the pose change comprises:
   a position shift between the new ECEF pose and the previous ECEF pose on a X-Y plane in the ECEF coordinate; and
   a yaw shift between the new ECEF pose and the previous ECEF pose along a yaw direction in the ECEF coordinate.

13. The method of claim 12, wherein:
   the threshold is a position shift threshold, and
   the jump is determined to occur in response to determining that the position shift in the ECEF coordinate exceeds the position shift threshold.

14. The method of claim 12, wherein:
   the threshold is a yaw shift threshold, and
   the jump is determined to occur in response to determining that the yaw shift in the ECEF coordinate exceeds the yaw shift threshold.

15. The method of claim 11, further comprising:
   receiving, by the apparatus, an adjusting input to adjust the threshold; and
   adjusting the threshold based on the adjusting input.

16. A non-transitory tangible computer-readable medium storing computer executable instructions which, when executed by one or more processors, cause a method for providing a global localization output to be performed, the method comprising:
- receiving navigation signals from a navigation system;
- processing the navigation signals received to determine, based on a fixed earth-centered, earth-fixed (ECEF) reference pose of a reference point in an ECEF coordinate, a new ECEF pose of the apparatus;
- converting the fixed ECEF reference pose of the reference point in the ECEF coordinate to an east-north-up (ENU) reference pose in an ENU coordinate, wherein the ENU reference pose is variable;
- determining whether a jump occurs in the new ECEF pose of the apparatus in the ECEF coordinate based on a pose change between the new ECEF pose and a previous ECEF pose of the apparatus;
- in response to determining that the jump occurs, updating the ENU reference pose based on the pose change;
- obtaining a new ENU local pose of the apparatus using the ENU reference pose; and
- outputting the new ENU local pose as a current pose of the apparatus.

17. The non-transitory tangible computer-readable medium of claim 16, wherein the ENU reference pose is updated based on the pose change by: calculating a reference shift of the ENU reference pose based on the pose change to absorb the jump in the ENU coordinate; and updating the ENU reference pose based on the reference shift.

18. The non-transitory tangible computer-readable medium of claim 16, wherein the jump is determined to occur in response to determining that the pose change exceeds a threshold.

19. The non-transitory tangible computer-readable medium of claim 18, wherein the pose change comprises:
- a position shift between the new ECEF pose and the previous ECEF pose on a X-Y plane in the ECEF coordinate; and
- a yaw shift between the new ECEF pose and the previous ECEF pose along a yaw direction in the ECEF coordinate.

20. The non-transitory tangible computer-readable medium of claim 19, wherein:
- the threshold includes a position shift threshold and a yaw shift threshold, and
- the jump is determined to occur in response to determining that the position shift in the ECEF coordinate exceeds the position shift threshold, or that the yaw shift in the ECEF coordinate exceeds the yaw shift threshold.

* * * * *